(12) United States Patent
Tonelli et al.

(10) Patent No.: US 9,596,957 B2
(45) Date of Patent: *Mar. 21, 2017

(54) RELIEF AND SAFETY VALVE FOR INSTANT BEVERAGE MACHINES

(71) Applicant: KONINKLIJKE PHILIPS N.V., Eindhoven (NL)

(72) Inventors: Stefano Tonelli, Gaggio Montano (IT); Massimo Lelli, Gaggio Montano (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 418 days.

This patent is subject to a terminal disclaimer.

(21) Appl. No.: 13/958,679

(22) Filed: Aug. 5, 2013

(65) Prior Publication Data

US 2014/0004249 A1 Jan. 2, 2014

Related U.S. Application Data

(63) Continuation of application No. 11/989,325, filed as application No. PCT/EP2006/064678 on Jul. 26, 2006, now Pat. No. 8,522,670.

(30) Foreign Application Priority Data

Jul. 27, 2005 (IT) ................ FI2005A0169

(51) Int. Cl.
*F16K 11/24* (2006.01)
*F16K 31/06* (2006.01)
(Continued)

(52) U.S. Cl.
CPC .............. *A47J 31/58* (2013.01); *A47J 31/46* (2013.01); *A47J 31/36* (2013.01); *A47J 31/4489* (2013.01);
(Continued)

(58) Field of Classification Search
CPC . A47J 31/46; A47J 31/58; F16K 1/307; F16K 11/105; F16K 11/24; F16K 17/0473;
(Continued)

(56) References Cited

U.S. PATENT DOCUMENTS 1,150,831 A * 8/1915 Benes ............... F16K 17/18
137/493.8
2,210,555 A * 8/1940 Podolsky ............ F16K 17/003
137/335
(Continued)

FOREIGN PATENT DOCUMENTS

CN 85201815 U 3/1986
CN 86210041 U 12/1987
(Continued)

OTHER PUBLICATIONS

International Search Report for PCT/EP2006/064678 Dated Oct. 24, 2006.
(Continued)

*Primary Examiner* — John Fox
*Assistant Examiner* — Seth W Mackay-Smith

(57) ABSTRACT

A hydraulic circuit for instant beverage machines includes a tank, a water extraction pipe contained in the tank, a flow-meter connected to the extraction pipe, a pump, a first vibration-damping valve, a boiler, a second relief and safety valve, a water/steam faucet, a third beverage flow valve, and a recovery tank.

7 Claims, 6 Drawing Sheets

(51) Int. Cl.
*F16K 17/04* (2006.01)
*A47J 31/46* (2006.01)
*A47J 31/58* (2006.01)
*A47J 31/36* (2006.01)
*A47J 31/44* (2006.01)
*A47J 31/54* (2006.01)

(52) U.S. Cl.
CPC ...... *A47J 31/542* (2013.01); *Y10T 137/87837* (2015.04); *Y10T 137/87877* (2015.04)

(58) Field of Classification Search
CPC .. F16K 17/048; F16K 17/06; Y10T 137/7772; Y10T 137/7774; Y10T 137/7779; Y10T 137/7841; Y10T 137/87837; Y10T 137/87861; Y10T 137/87877
See application file for complete search history.

(56) References Cited

U.S. PATENT DOCUMENTS

| | | | | |
|---|---|---|---|---|
| 3,421,546 | A * | 1/1969 | Jennings | F16K 31/0658 137/523 |
| 3,589,391 | A * | 6/1971 | Pagliaro | F16K 31/0651 137/493.8 |
| 5,303,733 | A * | 4/1994 | Nelson | B67D 1/1252 137/505.38 |
| 5,778,765 | A | 7/1998 | Klawuhn et al. | |
| 5,853,162 | A * | 12/1998 | Zurke | F02M 25/0836 137/493.7 |
| 6,763,759 | B2 * | 7/2004 | Denisart | A47J 31/36 99/295 |
| 7,089,849 | B2 | 8/2006 | Chen et al. | |
| 7,223,427 | B2 | 5/2007 | Knepler | |
| 7,640,845 | B2 | 1/2010 | Woodnorth et al. | |
| 7,946,219 | B2 | 5/2011 | Marconi | |
| 8,522,670 | B2 * | 9/2013 | Tonelli | A47J 31/46 137/878 |
| 2004/0079237 | A1 | 4/2004 | Denisart | |
| 2005/0279216 | A1 | 12/2005 | Miller | |
| 2006/0249030 | A1 | 11/2006 | Bienvenu et al. | |

FOREIGN PATENT DOCUMENTS

| | | | |
|---|---|---|---|
| EP | 0465877 A1 | 1/1992 | |
| EP | 0676163 A1 | 10/1995 | |
| EP | 1415580 A1 | 5/2004 | |
| IT | EP 0465877 A1 * | 1/1992 | ............. A47J 31/36 |
| IT | 930236 U1 | 6/1995 | |
| WO | 2006122916 A1 | 11/2006 | |

OTHER PUBLICATIONS

International Preliminary Report on Patentability for PCT/EP2006/064678 Dated Dec. 27, 2007.

* cited by examiner

RELIEF AND SAFETY VALVE FOR INSTANT BEVERAGE MACHINES

This application claims the benefit or priority of and describes relationships between the following applications: wherein this application is a continuation of U.S. patent application Ser. No. 11/989,325, filed Apr. 10, 2008, which is the National Stage of International Application No. PCT/EP2006/064678, filed Jul. 26, 2006, which claims the priority of foreign application FI2005A000169 filed Jul. 27, 2005, all of which are incorporated herein in whole by reference.

The present invention relates to machines used for the preparation of instant beverages such as coffee and the like.

Different types of instant beverage machines are known in the art, for example machines for making instant coffee.

They are provided with a hydraulic circuit which generally comprises a water tank, an infusion chamber for preparing the beverage, devices for feeding the powder of said beverage to said infusion chamber, devices for pumping water from the tank through the hydraulic circuit and toward the infusion chamber and an outlet spout for the instant beverage.

Typical hydraulic circuits used for the above purpose have a valve called electromagnet with a one-way (or multi-way) solenoid valve, used for performing many adjustment functions.

The water coming from the boiler enters said valve and controls the excess water discharge, the water delivery at high temperature or steam from special external spouts that can be used by the user, and the inlet of water at high temperature into the infusion chamber where the instant beverage is prepared, which is then delivered via the external spout.

The valves used are typically provided with an electromagnet and are known as Electromagnets with stem (or needle) valve. These valves have numerous drawbacks:
  they can be affected by scale;
  they are noisy;
  they can only control the discharge phase, hence they do not have multiple uses unless they are connected in series or in parallel with each other and equipped with additional boilers or heat exchangers to control the steam phase and maximum-pressure valves to control the safety of the circuit;
  recharge or drainage (when necessary) is not guaranteed when the circuit is unused for long periods of time —they cannot control the passage from the vapor state to the liquid state because in certain applications it is necessary to use special self-priming valves —expensive and not reliable —which may be used with the pumps. In other cases, complex and ineffective manual operations may have to be carried out by the user.

The hydraulic circuit, according to the present invention, is capable of overcoming the aforesaid drawbacks by introducing a topology based on one electromagnet and one boiler.

The present invention relates to a hydraulic circuit for instant beverage machines, a relief and a safety valve for said circuit and method for the preparation of instant beverages, as described in the claims which are an integral part of this description.

Figure 1:
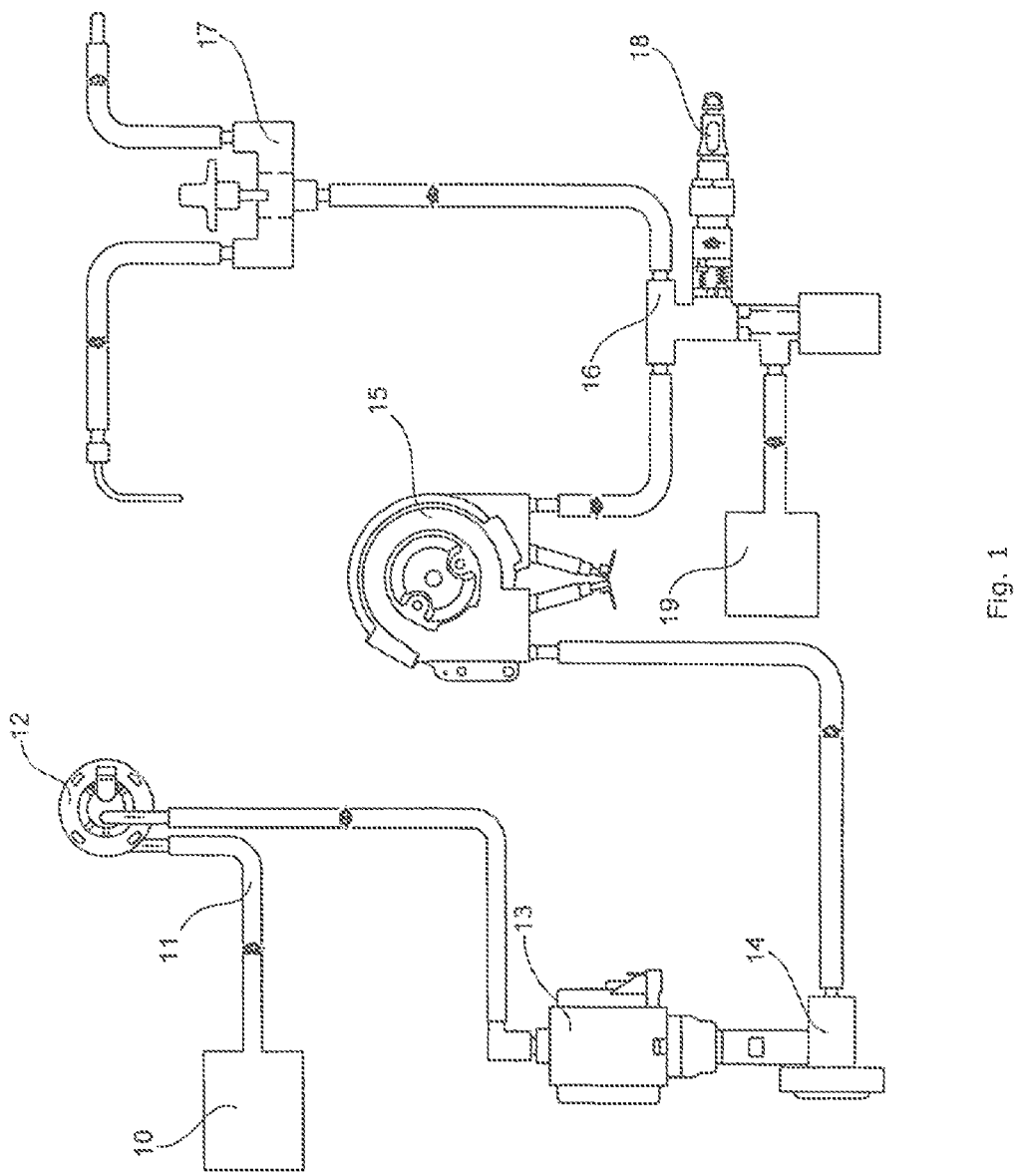
FIG. 1 shows a diagram of a hydraulic circuit for machines used for the preparation of instant beverages of the present invention.

With reference to FIG. 1, we can see a diagram of a hydraulic circuit for machines used for the preparation of instant beverages according to the present invention. There is a tank 10 which is connected to an extraction pipe 11 for the water contained in it. Said extraction pipe 11 leads the water into a pump 13 through a flow-meter 12. Said pump 13 is connected to the boiler 15 through a first vibration-damping valve 14 which releases the water into said tank if the pressure exceeds a specific threshold value. Downstream of said boiler is the relief and safety valve 16 provided with one inlet and three outlets. Downstream of said relief and safety valve 16 is a beverage flow valve 18 and a water/steam faucet 17 used for adjusting the delivery of steam or water/steam mixture towards the outside of the instant beverage machine, so that it can be used, for instance, to prepare other types of beverages.

When the user selects the beverage, the following operations take place:

1. The pump 13, pressurizes the water contained in the hydraulic circuit.

2. When the pressure of the hydraulic circuit exceeds a predetermined threshold, for example, set at about three bars, the water is discharged in a recovery tank 19 through the relief valve 16, 3. after a set time interval, the pump 13 stops and thus the hydraulic circuit is closed.

4. By using the control circuit and at least one temperature sensor, the boiler 15 can heat up the water to a preset temperature value.

5. At this stage, the beverage delivery unit moves to the operating position by engaging the delivery connector—pin, terminal connecting part of the hydraulic circuit.

6. When the pressure reaches about 3 bars, said relief valve 16 makes the water flow inside said delivery unit.

7. The beverage is delivered through the beverage flow valve 18.

8. After releasing the beverage, a special command from the control circuit energizes the control coil 31 of the relief valve 16 which opens up, thus reducing the pressure of the hydraulic circuit when the delivery unit is still engaged in the delivery connector—pin.

9. Likewise, the liquid pressurized in the delivery unit flows out through a hole with a spring calibrated at 0.2 bars and flows out of the drain towards said recovery tank 19.

10. The delivery unit returns to its initial position.

11. The operation is repeated up to step 2, in order to empty possible beverage residues from the circuit.

According to the present invention, the hydraulic circuit, by following the aforesaid sequence of steps, is able to overcome numerous drawbacks associated with the instant beverage machines included in the state of the art.

As a result, steps 1 to 3 will help remove the water with inadequate temperature from the hydraulic circuit and preheat all conduits, thereby achieving a beverage at an ideal temperature.

If the pump is unable to operate due to irregular functioning or overpressure, through said flow-meter 12 placed along the hydraulic circuit, the electronic control unit will warn you that there is no passage of liquid. Thus, the circuit will be discharged and self-recharging attempts will be performed. Without the aid of this system, everything would have to be carried out manually, thus making things difficult for the user.

Step 6 limits the pressure in the circuit to a typical value of about three bars. This will improve the safety and the reliability of the instant beverage machine, thereby also eliminating puffs in the infusion chamber, hence maintaining a constant temperature at higher values and achieving an optimum beverage.

Step 9, related to the post-infusion pressure release, allows better cleaning because the tablet for the preparation of the beverage is drier and the temperature remains constant.

Step 11 eliminates the reflux of any small particles coming from the infusion chamber toward the hydraulic circuit. Said particles can be harmful because they can damage the seals or contaminate the water or the steam coming out of the steam pipe, hence causing negative organoleptic consequences on the beverage to be prepared. This result is achieved, in the hydraulic circuits included in the state of the art, by introducing special one-way and/or two-way valve systems. Placing said relief and safety valve 16 inside the hydraulic circuit, according to the present invention, will reduce the pressure inside the circuit and eliminate the safety valve normally used in machines for the preparation of instant beverages included in the state of the art. Furthermore, since said relief and safety valve 16 is of the "slide" type, it is able to achieve an active-type seal, thus allowing less noise —because the coil requires less pilot power considering that it is aided by the pressure of the circuit —and avoiding scale problems, such as sticking parts, and thus allowing its positioning in the warm and/or calcareous zone of the hydraulic circuit, which is perfect for its operation.

Figure 2:
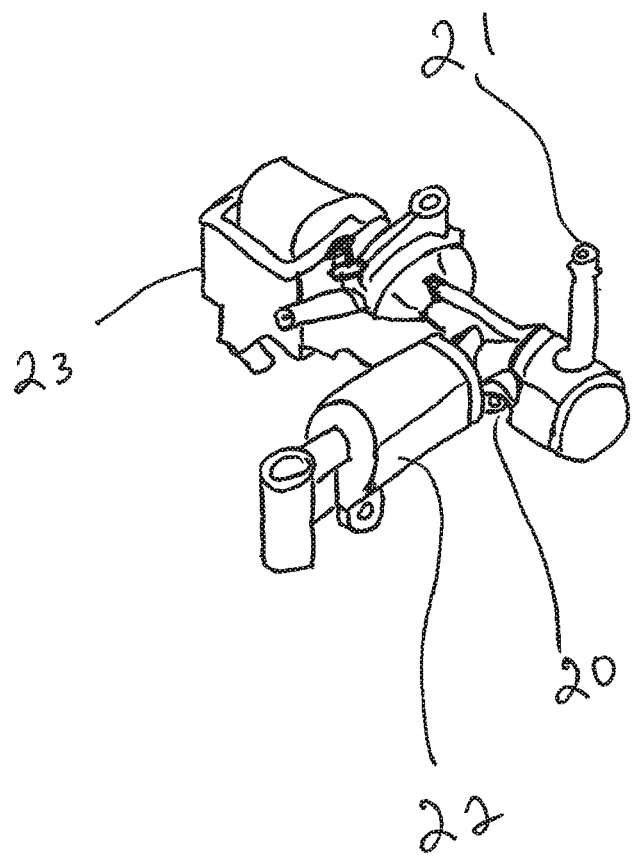
FIG. 2 shows a structure of the relief and safety valve.

With reference to FIG. 1 and FIG. 2, we can see the detailed structure of said relief and safety valve 16. We can see, in the order given, the water and steam. inlet 20 from the boiler 15, a first water and steam outlet 21 directed towards the faucet 17, a second outlet 22 of the pressurized water directed towards the beverage delivery valve 18 and a third outlet 23 for discharging water into the recovery tank 19, which is operated by a solenoid valve equipped with a maximum pressure limiting device—e.g. a pre-calibrated spring—which remains closed during normal operation and opens up if the pressure exceeds a specific threshold, usually around 16 to 20 bars, or if a specific command is sent to the control coil of the solenoid valve.

Figure 3:
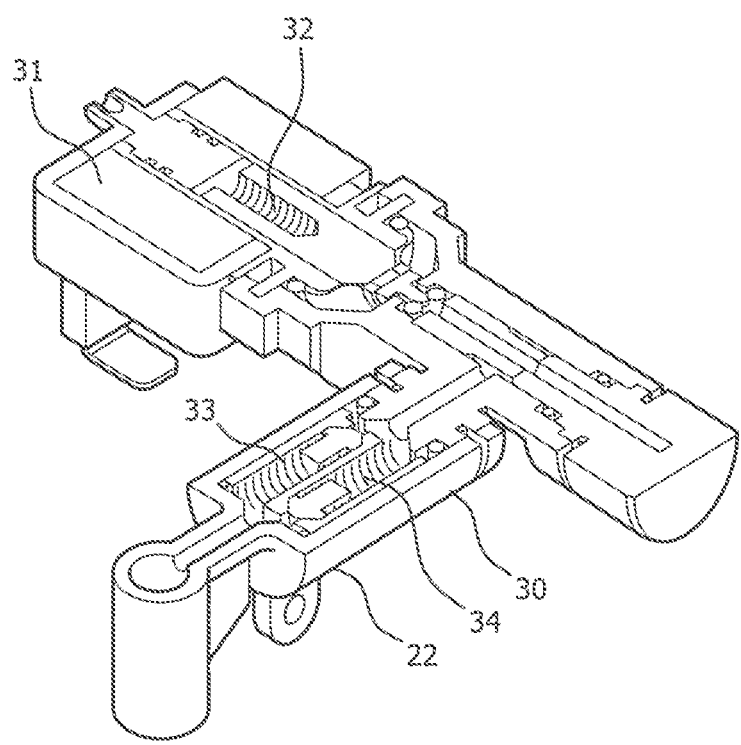
FIG. 3 shows a structure of an embodiment of the relief and safety valve.

With reference to FIG. 3, we can see the detailed structure of an embodiment of said relief and safety valve 16. Said outlet 22, which is connected to the beverage delivery unit, has a valve provided with a spring 33 usually calibrated at about 3 bars. In addition, it is provided with an inlet 30 with a spring 34 calibrated at 0.2 bars, which allows the passage of liquid in order to release the beverage delivery unit from the pressure. Said outlet 23, used for discharging water into the tank, is provided with a control coil 31 which is energized with an appropriate command and with a spring 32 calibrated at about 16/20 bars. As previously described, said relief and safety valve 16 is, for example, the "slide" type. This makes it possible to combine the safety valve and a double-exchange valve, placed between the electropilot and the beverage delivery unit, in one body.

Figure 4A:
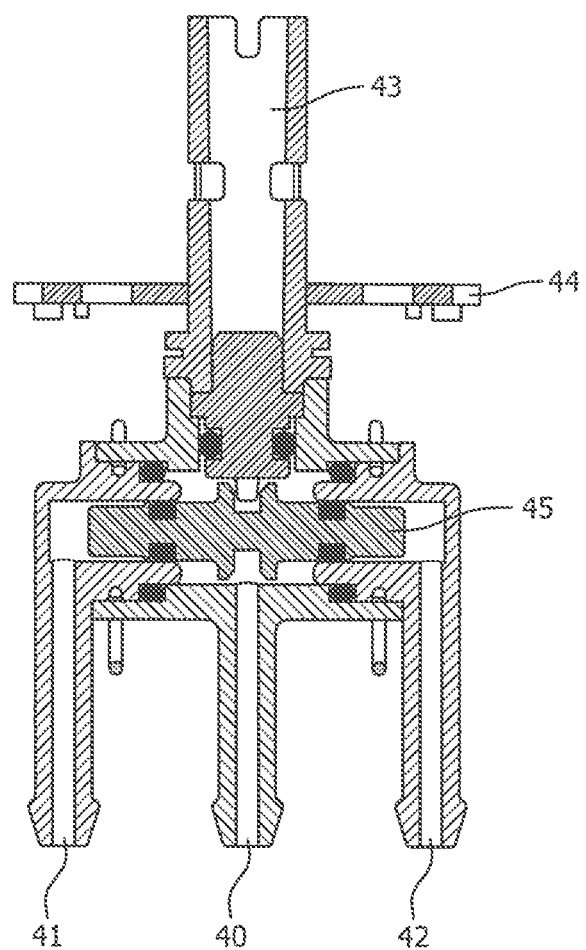
FIGS. 4a, 4b, 4c show structures of an embodiment of the water/steam faucet.

With reference to FIG. 4, we can see the detailed structure of a preferred embodiment of said water/steam faucet 17. In FIG. 4a, we can see said faucet in the first, out of three, possible positions. There is an inlet 40 and two outlets 41, 42, one of which 41 is directed to the outlet nozzle of the machine used for delivering water or steam, whereas the other 42 is directed, for instance, toward possible devices connected to the instant beverage machine, such as the cappuccino device, in accordance with the published Italian Patent application No. MI2005A000880. Additionally, there is a faucet lever 43, a support 44 provided with sensors for detecting the position of said lever 43 and a slider 45 which opens and closes the passages of said faucet 17.

Figure 4B:
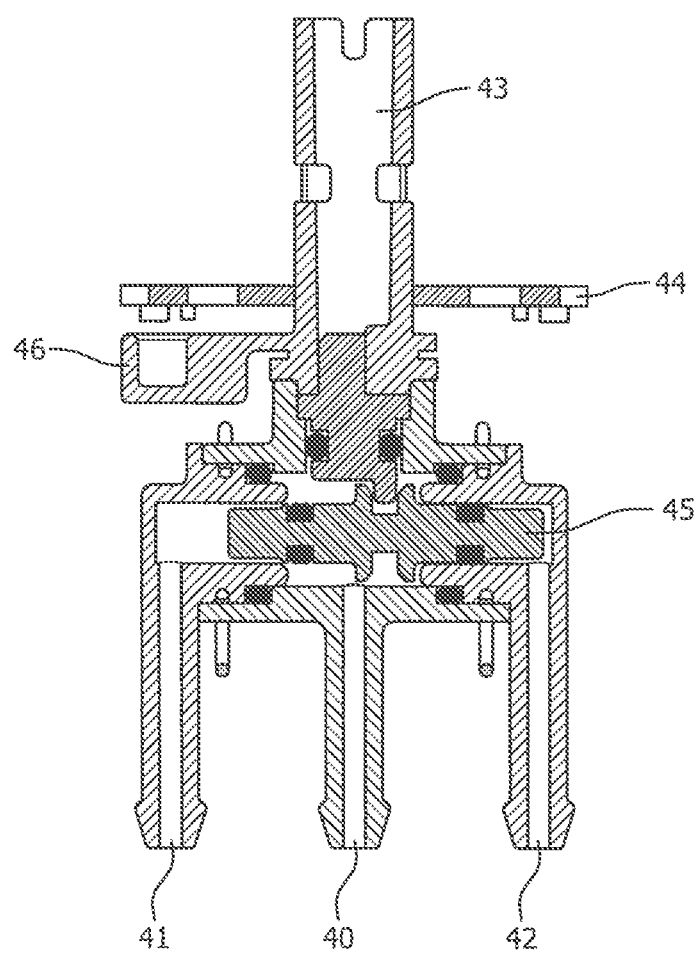
Figure 4C:
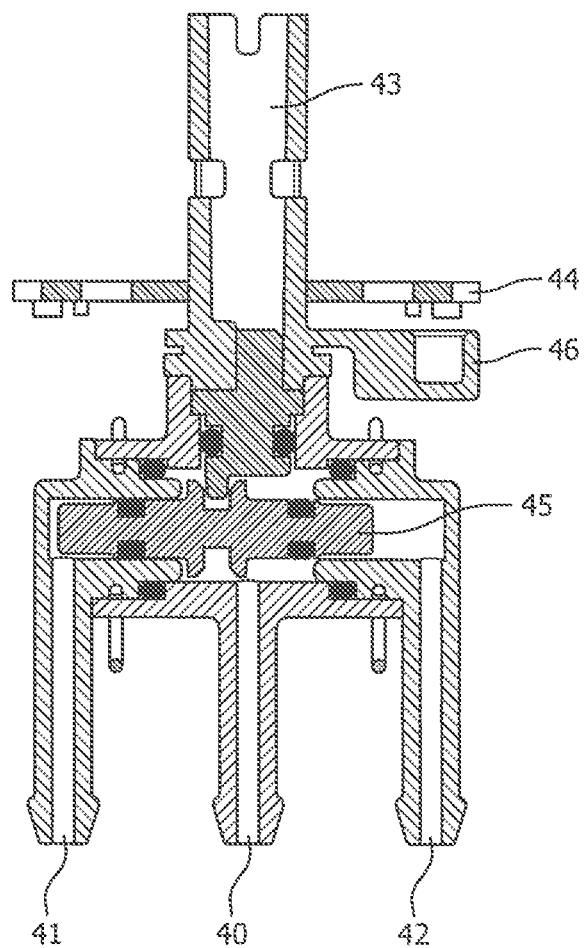

FIGS. 4b and 4c show other two positions that can be reached by said faucet 17. The selection of the outlets is carried out by turning the faucet lever 43. Said lever 43 is connected to said slider 45 which opens or closes the outlets, according to the position, by selecting the outlet required. The position of said lever 43 is detected by sensors, e.g. REED sensors, placed on the support of the faucet, and by a magnet 46 placed on said lever 43. Each position of the lever 43 corresponds to a specific function—for instance, position 1 delivers water and steam to the faucet, the boiler heats the water to proper temperature and the pump delivers the water/steam. mixture.

The invention claimed is:

1. A valve usable in a hydraulic circuit for instant beverage machine comprising:
   a water/steam inlet;
   a first water/steam outlet directed to a water/steam faucet;
   a second outlet for directing pressurized water to a beverage flow valve; and
   a third outlet for discharging water into a recovery tank wherein said third outlet is operated by a solenoid valve equipped with a first maximum pressure limiting device which remains closed during normal operation and opens up if a pressure exceeds a specific threshold, or if a specific command is sent to a control coil of said solenoid valve,
   wherein said second outlet is provided with a second maximum pressure limiting device for directing the pressurized water to the beverage flow valve, and wherein said second outlet has an inlet which is provided with a valve equipped with a third maximum pressure limiting device which enables passage of liquid in order to release pressure from the beverage flow valve, and
   wherein said second maximum pressure limiting device is a pre-calibrated spring, and said third maximum pressure limiting device is a further pre-calibrated spring.

2. The valve of claim 1, wherein the valve is a combination valve contained in a single body including the water/steam inlet, the first water/steam outlet, the second outlet and the third outlet.

3. A valve usable in a hydraulic circuit for an instant beverage machine comprising:
   a water/steam inlet;
   a first water/steam outlet directed to a water/steam faucet;
   a second outlet for directing pressurized water to a beverage flow valve; and
   a third outlet for discharging water into a recovery tank wherein said third outlet is operated by a solenoid valve equipped with a first maximum pressure limiting device which remains closed during normal operation and opens up if a pressure exceeds a specific threshold, or if a specific command is sent to a control coil of said solenoid valve,
   wherein said second outlet is provided with a second maximum pressure limiting device for directing the pressurized water to the beverage flow valve, and wherein said second outlet has an inlet which is provided with a valve equipped with a third maximum pressure limiting device which enables passage of liquid in order to release pressure from the beverage flow valve, and wherein the first maximum pressure limiting device comprises a first pre-calibrated spring calibrated at a first level, wherein the second maximum pressure limiting device comprises a second pre-calibrated spring calibrated at a second level lower than the first level, wherein the third maximum pressure limiting device comprises a third pre-calibrated spring calibrated at a third level lower than the second level.

4. The valve of claim 3, wherein the valve is a combination valve contained in a single body including the water/steam inlet, the first water/steam outlet, the second outlet and the third outlet.

5. A valve usable in a hydraulic circuit for an instant beverage machine comprising:
- a water/steam inlet;
- a first water/steam outlet directed to a water/steam faucet;
- a second outlet for directing pressurized water to a beverage flow valve; and
- a third outlet for discharging water into a recovery tank wherein said third outlet is operated by a solenoid valve equipped with a first maximum pressure limiting device which remains closed during normal operation and opens up if a pressure exceeds a specific threshold, or if a specific command is sent to a control coil of said solenoid valve,
- wherein said first maximum pressure limiting device is a pre-calibrated spring, and
- wherein said second outlet, connected to a beverage delivery unit, comprises: a valve provided with a spring calibrated at a first level; an inlet having a spring calibrated at a second level lower than the first level, said inlet being adapted to allow passage of liquid in order to release the beverage delivery unit from its pressure.

6. The valve of claim 5, wherein said third outlet, used for discharging water into the recovery tank, is provided with the control coil which is energized with the specific command and with the pre-calibrated spring calibrated between 16 to 20 bars.

7. The valve of claim 5, wherein the valve is a combination valve contained in a single body including the water/steam inlet, the first water/steam outlet, the second outlet and the third outlet.

* * * * *